United States Patent [19]
Huang et al.

[11] Patent Number: 5,175,013
[45] Date of Patent: * Dec. 29, 1992

[54] FROZEN DESSERT COMPOSITIONS AND PRODUCTS

[75] Inventors: Victor T. Huang, Mounds View; William A. Barrier, Plymouth; Luther H. Leake, Arden Hills, all of Minn.; Sharon G. Wittinger, Morristown, N.J.

[73] Assignee: The Pillsbury Company, Minneapolis, Minn.

[*] Notice: The portion of the term of this patent subsequent to May 12, 2009 has been disclaimed.

[21] Appl. No.: 744,088

[22] Filed: Aug. 12, 1991

Related U.S. Application Data

[63] Continuation-in-part of Ser. No. 636,229, Dec. 31, 1990, Pat. No. 5,112,626.

[51] Int. Cl.$^5$ .................................. A23G 9/02
[52] U.S. Cl. .................................. 426/565; 426/43; 426/566; 426/567; 426/583; 426/658; 426/804; 426/421
[58] Field of Search .................. 426/42, 43, 565, 566, 426/567, 583, 658, 804

[56] References Cited

U.S. PATENT DOCUMENTS

| | | | |
|---|---|---|---|
| 3,128,193 | 4/1964 | Hilker | 426/565 |
| 3,335,013 | 8/1967 | Wolfmeyer | 426/565 |
| 3,345,185 | 10/1967 | Pisani et al. | 426/565 |
| 3,800,036 | 3/1974 | Gabby et al. | 426/565 |
| 3,809,764 | 5/1974 | Gabby et al. | 426/565 |
| 3,914,441 | 10/1975 | Finney et al. | 426/565 |
| 3,928,649 | 12/1975 | Cobb | 426/565 |
| 3,962,465 | 6/1976 | Richter et al. | |
| 4,110,476 | 8/1978 | Rhodes | 426/565 |
| 4,219,581 | 8/1980 | Dea et al. | 426/565 |
| 4,282,262 | 8/1981 | Blake | 426/565 |
| 4,333,953 | 6/1982 | Trzecieski | 426/565 |
| 4,374,861 | 2/1983 | Trzecieski | 426/565 |
| 4,376,791 | 3/1983 | Holbrook | 426/565 |
| 4,400,405 | 8/1983 | Morley et al. | 426/565 |
| 4,434,186 | 2/1984 | Desia et al. | 426/565 |
| 4,435,439 | 3/1984 | Morris | 426/565 |
| 4,497,841 | 2/1985 | Wudel | 426/565 |
| 4,510,166 | 4/1985 | Leuchin | 426/565 |
| 4,542,035 | 9/1985 | Huang et al. | 426/565 |
| 4,609,561 | 9/1986 | Wade et al. | 426/565 |
| 4,626,441 | 12/1986 | Wolkstein | 426/565 |
| 4,737,374 | 4/1988 | Huber et al. | 426/565 |
| 4,832,976 | 3/1989 | Griffin | 426/565 |
| 4,837,035 | 6/1989 | Baker et al. | 426/565 |
| 4,837,036 | 6/1989 | Baker et al. | 426/565 |
| 4,840,813 | 6/1989 | Greenberg et al. | 426/565 |
| 4,853,246 | 8/1989 | Stevens | 426/565 |
| 4,874,627 | 10/1989 | Greig et al. | 426/565 |
| 5,051,271 | 9/1991 | Iyengar et al. | 426/565 |

FOREIGN PATENT DOCUMENTS

WOA9101091 2/1991 PCT Int'l Appl.
1444143 6/1976 United Kingdom.

*Primary Examiner*—Jeanette Hunter
*Attorney, Agent, or Firm*—Merchant, Gould, Smith, Edell, Welter & Schmidt

[57] ABSTRACT

The invention is directed compositions which are capable of being converted to frozen dairy dessert products, including ice cream and yogurt desserts, which have organoleptic qualities comparable to high fat frozen desserts such as ice cream. The compositions are either aerated or quiescently frozen. The dessert products are highly stable to heat shock with a high degree of creaminess. The compositions are composed of a source of milk protein, sweetening agent, partially hydrolyzed starch, and water. Preferably, the compositions are composed of only natural ingredients without added stabilizing gums. Also provided is a method of making the frozen dairy dessert products and a method of preparing a yogurt premix for preparing aerated frozen yogurt desserts.

20 Claims, No Drawings

FROZEN DESSERT COMPOSITIONS AND PRODUCTS

CROSS-REFERENCE TO RELATED APPLICATIONS

This patent application is a continuation-in-part of U.S. Application Ser. No. 07/636,229, filed Dec. 31, 1990, now U.S. Pat. No. 5,112,626.

BACKGROUND OF THE INVENTION

Frozen dairy dessert products such as ice cream, ice milk, milk shakes, sherbet, yogurt, sorbet and the aerated versions thereof, are popular due to their convenience, wide spread availability, nutritive value and appealing forms, flavors, and colors. Such dairy desserts may range in fat content from 0.01–18 wt-%. A weight conscious society has further popularized non-fat and low fat preparations. In addition to consumer expectations of flavor, appearance, and in particular the physical properties of embodiments such as aerated frozen dessert products, the nature and composition of these products are regulated by various standards of identity promulgated by the U.S. Food and Drug Administration and the individual states. The combination of rigid consumer acceptance criteria, regulatory standards and the complex nature of the interactions which produce an acceptable frozen dessert product, make it difficult to formulate an aerated frozen dessert having improved characteristics, particularly when formulating a reduced or non-fat product containing only natural components and ingredients without added traditional stabilizing gums.

The foregoing factors are also true for quiescently frozen dairy dessert products such as ice cream bars, novelty dessert bars, yogurt bars, ice milk bars, fudge pops and the like. That is, it is difficult to formulate quiescently frozen desserts which have improved characteristics and which also contain only natural ingredients, contain no added stabilizers and have a reduced fat content.

It is particularly desirable for frozen dessert products to be stable against "heat shock," which is cyclic conditions of partial thawing and refreezing which occur during typical storage, shipping and handling of frozen dairy desserts. These cycles of fluctuating temperatures promote ice crystal growth in the dessert product, and a resultant gritty texture to the product. The gritty texture and mouthfeel, and diminished appearance detract from the overall general quality of the product.

Stabilizing gums and emulsifiers have been used in an attempt to improve the heat shock stability of frozen food products. Examples of stabilizing gums which have traditionally been used in ice cream include gum acacia, guar gum, locust bean gum, carrageenan, and the like. Often microcrystalline cellulose and carboxymethylcellulose are used in combination with the stabilizing gums to maximize their functional effectiveness. Emulsifiers help provide stability by facilitating the formation of an interface between the aqueous phase and the fat phase. Milk and egg yolks are both sources of natural emulsifiers. Commercially available emulsifiers are generally derived by chemical reaction with naturally occurring glycerides. See for example, U.S. Pat. No. 3,800,036 (issued Mar. 26, 1974) and U.S. Pat. No. 3,809,764 (issued May 7, 1974) to Gabby et al., and U.S. Pat. No. 4,552,773 to Kahn et al. (issued Nov. 12, 1985). In U.S. Pat. No. 4,400,405 to Morley et al. (issued Aug. 23, 1983), low fat aerated frozen soft-serve dairy desserts containing high levels of stabilizers, emulsifiers and polyhydric alcohols are provided. U.S. Pat. No. 4,497,841 to Wudel et al. (issued Feb. 5, 1985) discloses reduced fat, aerated frozen dairy desserts prepared with added whey protein concentrate to partially replace the milk solids non-fat, and containing fructose rather than sucrose as the sweetening agent, with added emulsifiers and stabilizers to improve the body and texture of the frozen desserts. U.S. Pat. No. 4,874,627 to Greig et al. (issued Oct. 17, 1989) discloses non-fat frozen dairy dessert compositions which incorporate stabilizers and contain at least some caramelized milk solids. In combination with stabilizers, high levels of corn syrup solids have been added to low-fat frozen dessert compositions in an attempt to avoid lactose crystallization and overcome sandiness from high lactose levels, as disclosed in U.S. Pat. No. 3,345,185 to Pisani et al. (issued Oct. 3, 1967).

Though gums improve stability, the use of gums presents several drawbacks. The quantity of stabilizing gums required to provide effective heat shock stability often produces a frozen dessert product which has an unacceptable greasy and/or gummy mouthfeel. In addition, although stabilizing gums may be derived from naturally-produced substances, consumers tend to perceive a product which contains gums to contain artificial rather than all natural ingredients.

Ultrafiltration of the milk component of dairy desserts has been used in an attempt to reduce lactose crystallization in the frozen dessert products. G.B. Pat. No. 1,444,143 to Aktiengesellschaft de Danske Sukkerfabrikker (Inventor O.J. Olsen; published Jun. 30, 1976) discloses preparing frozen desserts by subjecting skim milk or whey concentrate to ultrafiltration to concentrate the milk solids and reduce the ratio of lactose to milk protein, with the addition of stabilizers and emulsifiers to the dessert compositions.

U.S. Pat. No. 4,840,813 to Greenberg et al. (issued Jun. 20, 1989) also discloses low and non-fat dairy desserts prepared with ultrafiltered skim milk. To provide fat-like benefits for improved heat shock stability, high levels of whey protein concentrate, being at least 50% undenatured, are added to the compositions to provide a whey protein to casein ratio dramatically different than that observed in milk.

Therefore, an object of the present invention is to provide a composition comprising all natural ingredients without added stabilizing gums, which is capable of being processed into an aerated frozen dairy dessert product. Another object is to provide aerated frozen desserts which are heat shock stable over a range of fat content, and which have a high degree of creaminess, and organoleptic qualities comparable to high fat frozen desserts such as ice cream. Yet another object is to provide a method of making the dairy dessert compositions and frozen dairy dessert products of the invention. Yet another object of the invention is to provide a quiescently frozen dessert product with these characteristics.

SUMMARY OF THE INVENTION

These and other objects are achieved by the present invention which is directed to compositions for preparing aerated and quiescently frozen dairy desserts from all natural ingredients, and the process for producing the compositions and frozen dessert products. The aerated frozen desserts have improved stability and creaminess with organoleptic qualities comparable to high fat frozen desserts such as ice cream, regardless of actual fat content. Preferred embodiments include aerated frozen ice cream and yogurt desserts. Preferred embodiments also include the above compositions which are quiescently frozen.

The compositions are composed of a source of milk protein, a sweetening agent, a partially hydrolyzed starch component, and water. The compositions preferably contain only natural ingredients and are free of added stabilizing gums. The effective proportions of the four components of the composition combine to provide stability for the frozen dessert products under typical distribution conditions. The compositions contain greater than about 6 wt-% partially hydrolyzed starch having a preferred dextrose equivalent (DE) value of less than about 36 DE, and an effective amount of milk protein to provide an aerated frozen dairy dessert with enhanced stability against heat shock, and creaminess with substantially reduced iciness similar to high fat ice cream. The milk protein component preferably has a casein to whey protein ratio which is the same or similar to that found naturally in skim milk, or about 4:1. The compositions contain water in an amount effective, preferably about 10-65 wt-%, to achieve a total composition further contain less than about 6 wt-% lactose, and may contain about 0.01-18 wt-% butterfat. The composition and dessert products may optionally include a source of natural emulsifying agent, such as egg yolk, to facilitate emulsification during processing. The overrun, or amount of air incorporated into the aerated frozen dessert product as a percent of the volume of the unfrozen dessert composition, is about 15-120%, preferably less than about 60%.

It has surprisingly been found that the above-described composition works well for quiescently frozen dessert products. The quiescently frozen dessert product may have an overrun of less than 10% to 120% or greater. Preferably, the overrun is up to 30%, more preferably less than 15%.

The term "frozen," as used herein, means that the product is solidified under freezing conditions, with or without air incorporation and with or without agitation, to a hardpack, or a soft, semi-fluid, or spoonable consistency. As used herein, the term wt-% refers to the weight percentage of the ingredient in relation to the total weight of the composition, mixture, or product, whichever applies. The term "quiescently frozen" as used herein means that the product has been statically frozen, that is, frozen without the accompaniment of stirring or agitation.

DETAILED DESCRIPTION OF THE INVENTION

The dairy dessert compositions of the invention may be used to provide frozen, aerated dessert products, such as ice cream and yogurt desserts, which possess organoleptic characteristics of high-fat ice cream. The all-natural ingredient compositions and dessert products contain milk protein, a sweetening agent, partially hydrolyzed starch, and water. The compositions and dessert products are free of added stabilizing gums which have traditionally been added to frozen desserts.

The dairy dessert compositions of the invention may likewise be used to provide quiescently frozen dessert products such as ice cream bars, novelty dessert bars, yogurt bars, ice milk bars, fudge pops and the like which passes organoleptic characteristic of high-fat products. The quiescently frozen products contain all of the above-enumerated characteristics.

Although it is not meant to be a limitation of the invention, it is believed that several compositional factors contribute to the stability of the aerated frozen desserts to heat shock. Some of these factors include the addition of milk protein and of partially hydrolyzed starch. The proportions of the ingredients, as for example, partially hydrolyzed starch to milk protein, and partially hydrolyzed starch to sweetening agent, also enhance the stability of the desserts. Other factors which contribute to the stability of the desserts will be apparent from the following discussion and examples.

A source of milk protein is added to the compositions as a source of high molecular weight compounds to provide body and texture to the dessert compositions, and decrease sensitivity to temperature fluctuations and increase stability to heat shock of the aerated frozen dessert products. Primarily, milk proteins include casein and whey protein. It is preferred that the milk protein component has a casein to whey protein ratio according to that found naturally in skim milk, or about 4:1. The dessert compositions contain at least about 4 wt-%, preferably about 4-20 wt-% milk protein, more preferably about 5-12 wt-%, most preferably about 6-10 wt-%. Milk protein may be derived from any suitable milk source, as for example, skim milk, condensed skim milk, ultrafiltered skim milk concentrate or retentate, nonfat dry milk powder, lactose-reduced nonfat milk, milk protein isolate, and the like. Milk protein substitutes such as milk protein, casein, soy milk, soy protein, milk replacers, and the like, may also be used. Whole milk and buttermilk may also be added.

It is preferred that at least a portion of a skim milk ingredient is concentrated by means of an ultrafiltration technique as described, for example, in L.E. Applegate, *Chem. Enq.* Jun. 11, 1984, pages 64-89; and Great Britain Patent No. 1,444,443 to Aktiengesellschaft DE Danske Sukkerfabrikker (published Jun. 30, 1976), the disclosures of which are incorporated by reference herein. It is preferred that the ultrafiltration will concentrate the total solids in the skim milk component from about 9 wt-% to about 20-23 wt-%, and reduce the lactose to milk protein ratio, to provide a skim milk retentate which has a five-fold increase in the concentration of the high molecular weight components such as protein, more commonly known as UF5X skim milk. Higher or lower concentration levels of ultrafiltered skim milk, such a UF 3-7X skim milk retentate may also be used in the present compositions. Reduction in the amount of lactose in the dessert compositions decreases the potential for development of a sandy texture in frozen dessert products.

The compositions also include a partially hydrolyzed starch component which is an acidic or enzymatically hydrolyzed starch material, as for example, potato starch, corn starch, wheat starch or rice starch, which will provide thickening or body to the composition. The compositions include about 6-16 wt-% partially hydrolyzed starch having a dextrose equivalent (DE) of about 5-35, preferably about 10-30 DE, with an about 15-26 DE partially hydrolyzed corn starch being more preferred. Compositions prepared according to the invention but which contain corn syrup having a DE value of higher than about 36 DE tend to have an unacceptably thin consistency, an unacceptably high degree of sweetness, and a high level of heat shock instability. Corn syrups having a value of less than about 36 DE have been found to provide dessert compositions and products having improved heat shock stability and creaminess while having an acceptable level of sweetness.

The higher amount of partially hydrolyzed starch material relative to the milk protein component in the compositions also contribute to the enhanced stability of the frozen dessert products to heat shock. The ratio of partially hydrolyzed starch to milk protein in the compositions is about 0.8-2.75:1, more preferably about 1-2:1.

A premix composition suitable for preparing the dairy dessert products, may include about 6-16 wt-% partially hydrolyzed starch, preferably a corn syrup solid derived from a corn syrup having a dextrose equivalent of about 5-35, preferably about 10-30 DE, more preferably about 15-26 DE, and an effective amount of milk protein to provide a ratio of partially hydrolyzed starch to milk protein of about 0.8-2.75:1. It is preferred that milk protein is present in the premix in an amount of about 4-20 wt-%, more preferably about 5-12 wt-%, most preferably about 6-10 wt-%. An effective amount of sweetening agent and water may be combined with the premix to provide the dessert compositions of the invention. In an alternative embodiment, the premix may be cultured to provide a yogurt premix for use in forming the yogurt dessert product. In this instance the premix can contain at least a source of butter fat, a source of milk protein and active yogurt culture. The culture premix may be combined with the other ingredients of the composition, preferably in an amount of from about 5 to 80 wt-%, to form the final mixture.

The dessert compositions further include a natural or artificial sweetening agent such as sucrose, fructose, aspartame, and the like. The compositions may include about 0.001-18 wt-% sweetening agent, being preferably sucrose.

The compositions contain about 30-44 wt-% total solids, and about 0.01-18 wt-% butterfat. Optionally, cream and/or a blend of egg yolk with sugar, may be added to the compositions for flavor enhancement. Egg yolk is beneficial as a natural emulsifier, and incidentally to improve the stability of the frozen dessert products. Other ingredients which may be added to the compositions and dessert products of the invention include, as for example, flavorings, condiments such as nuts, fruits, and candies, and colorings.

Optionally, after aging, the desserts mixture may be spray-dried according to any suitable method, and the composition later reconstituted and aerated to make a frozen dessert product. Also, the composition could be prepared with dry blended ingredients and later reconstituted to produce convenient frozen desserts suitable, for example, in food service applications.

The products may be in the form of, for example, a hard-frozen, bulk-packaged dessert, a soft-serve dessert, a milk shake dessert, and the like. The amount of overrun of the frozen dessert products may be about 15-120%. To provide a dessert product having the qualities of a high quality aerated frozen ice cream dessert product, it is preferred that the dessert has an overrun of less than about 60%.

The products may also be in the form of quiescently frozen dessert product such as a bar, a novelty bar, or pops and the like. The amount of overrun of quiescently frozen dessert products may be from less than 10% to more than 120%, preferably up to 35%, more preferably up to 15%.

The dessert products of the present invention have improved stability and are capable of retaining organoleptic properties similar to high fat frozen desserts, such as creaminess, smoothness, and taste and retain these properties for the shelf-life of the product, under conditions of typical frozen dessert storage, distribution and handling, especially conditions related to heat shock. In particular, the frozen dessert products are substantially reduced in iciness, have a texture which is smooth with a substantially reduced amount of large ice crystals, and have a mouthfeel which mimics that of high fat frozen desserts such as ice creams being substantially smooth without grittiness. Advantageously, the improved stability to heat shock of the present dessert products allow the dessert products to be produced and distributed nationally and internationally from a single location.

The invention will be described with reference to various specific and preferred embodiments and techniques. However, it should be understood that many variations and modifications may be made while remaining within the spirit and scope of the invention.

EXAMPLE I

Protocol for Preparing Frozen Dessert Products

Frozen aerated ice cream and yogurt desserts were prepared by mixing together the ingredients according to the weight percentages (wt-%) indicated in the Tables as shown below, to make 10,000 lbs. batches. Ingredients in liquid form were used to facilitate blending, although dry ingredients may be used.

The listed ingredients, other than vanilla, yogurt premix, condiments, flavoring and coloring, were placed in a blend tank and stirred until the mixture was thoroughly blended. To facilitate mixing of the ingredients, the UF5X skim milk retentate was first blended with a portion of condensed skim milk in a ratio of about 85:15, respectively. The mixture was pasteurized by high temperature short time (HTST) pasteurization at about 180° F. for approximately two minutes, followed by two-stage homogenization at about 1500 psi. during the first stage and about 500 psi. during the second stage. Pasteurization may be by batch method, HTST, or any suitable method. The mixture may be homogenized according to any suitable method.

The mixture was then cooled to about 40° F. The vanilla aliquot was then added. For preparation of yogurt desserts, the indicated aliquot of yogurt premix, as prepared according to the protocol described in Example II, was added. The dessert mixtures may be aged, or held, for 0-24 hours. The mixtures for the examples herein were held for about 4-16 hours at about 40° F.

The mixtures were then placed into a standard ice cream freezer, agitated to provide an overrun of about 20-40%, and extruded at about 20-25° F. The aerated desserts were placed in containers and held in a −30° F. freezer for about 1-2 hours.

Optionally, after aging, the dessert composition may be placed in containers, frozen, and/or held at freezing temperatures for a desired period of time, and then aerated to provide a frozen dessert product.

Optionally, after aging, the dessert mixture may be spray-dried according to any suitable method, and the composition later reconstituted and aerated to make a frozen dessert product. Also, the composition could be prepared with dry blended ingredients and later reconstituted to produce convenient frozen desserts suitable, for example, in food service applications.

Pursuant to this protocol, frozen desserts of the invention may be prepared by substituting amounts of the appropriate ingredients in the foregoing steps.

EXAMPLE II

Preparation of Yogurt Premix

To make 10,000 pounds of the yogurt premix, the following ingredients were placed in a blend tank and blended together:

|  | Pounds | Total Solids (wt-%) |
|---|---|---|
| cream, 40 wt-% fat | (500) | 45.3 |
| condensed skim milk | (5540) | 32.0 |
| water | (3960) | — |

The mixture was HTST pasteurized at about 185° F. for about 17 seconds. Pasteurization may otherwise be by batch method, or any other suitable method. The mixture was then two-stage homogenized at 1500 psi. in the first stage, and 500 psi. in the second stage, and held at about 185° F. for approximately 30 minutes. Homogenization of the mixture may be by two-stage homogenization, or any other suitable method.

The mixture was then allowed to cool to between about 90°–114° F., and inoculated with about 500 grams of a mixture of *Streptococcus thermophilous* and *Lactobacillus bulqaricus* cultures. Other suitable lactic acid producing bacterial cultures include, for example, *Streptococcus lactis*, and *Lactobacillus acidophilius*. The inoculated mixture was agitated for approximately 30 minutes to about evenly mix in the cultures. The mixture was then allowed to ferment without agitation at between about 90°–114° F. for approximately 10–12 hours until the titratable acidity (TA) reached about 1.1–2.0. Titratable acidity, as used herein, is the % acidity in the product and is expressed as the % of lactic acid. The resulting yogurt premix was allowed to cool with agitation to about 40° F.

An aliquot of the cooled yogurt premix was then added to the dessert composition as indicated in Example I to provide an aerated frozen yogurt dessert. The pH of the final dessert composition was about 6.2. Also, other commonly produced cultured dairy products may be substituted for the yogurt portion to yield other cultured frozen dessert products. The ingredients and methodology employed in the production of these optional other cultured premixes would, of course, be dependent upon the particular cultured frozen dessert product being produced.

Pursuant to this protocol, yogurt premixes may be prepared by substituting amounts of the appropriate ingredients in the foregoing steps.

EXAMPLE III

Aerated Frozen Desserts

Aerated frozen ice cream desserts, compositions 1–5 and 7, and yogurt dessert, composition 6, were prepared by mixing together the ingredients according to the wt-% indicated in Table 1, as shown below, following the protocol as descried in Examples I and II.

TABLE 1

| | Frozen Dessert Compositions[1] | | | | | | |
|---|---|---|---|---|---|---|---|
| | 1 | 2 | 3 | 4 | 5 | 6 | 7 |
| UF5 × skim milk blend[2] | 37.95 | 0.00 | 0.00 | 23.00 | 23.70 | 42.80 | 0.00 |
| Condensed skim milk | 21.00 | 29.10 | 29.10 | 15.67 | 0.00 | 0.00 | 23.50 |
| Cream (40% fat) | 0.00 | 7.45 | 7.45 | 7.36 | 37.44 | 6.30 | 37.47 |
| Sugar-egg yolk blend[3] | 4.00 | 4.00 | 4.00 | 4.00 | 4.00 | 4.00 | 4.00 |
| corn syrup, 26DE[4] | 14.00 | 0.00 | 0.00 | 14.00 | 8.00 | 11.00 | 0.00 |
| corn syrup, 36DE[5] | 0.00 | 15.01 | 0.00 | 0.00 | 0.00 | 0.00 | 0.00 |
| corn syrup, 63DE[6] | 0.00 | 0.00 | 14.72 | 0.00 | 0.00 | 0.00 | 0.00 |
| Sucrose | 11.40 | 13.32 | 13.32 | 13.32 | 9.07 | 12.00 | 13.40 |
| Water | 11.05 | 30.52 | 30.81 | 22.05 | 17.19 | 3.30 | 21.03 |
| Yogurt premix[7] | 0.00 | 0.00 | 0.00 | 0.00 | 0.00 | 20.00 | 0.00 |
| Vanilla | 0.60 | 0.60 | 0.60 | 0.60 | 0.60 | 0.60 | 0.60 |
| TOTALS | 100.00 | 100.00 | 100.00 | 100.00 | 100.00 | 100.00 | 100.00 |
| Breakdown of compositions | | | | | | | |
| Total solids | 40.00 | 40.00 | 40.00 | 40.00 | 40.00 | 40.00 | 40.00 |
| Lactose | 5.83 | 5.16 | 5.16 | 4.24 | 2.46 | 4.16 | 5.04 |
| Fat | 1.11 | 4.00 | 4.00 | 4.00 | 16.00 | 4.00 | 16.00 |
| Milk protein (mp) | 8.42 | 3.50 | 3.50 | 5.59 | 4.50 | 8.34 | 3.45 |
| 26 DE corn syrup solids (css) | 10.85 | 0.00 | 0.00 | 10.85 | 6.20 | 9.53 | 0.00 |
| 26 DE css:mp | 1.29:1 | 0.00 | 0.00 | 1.94:1 | 1.38:1 | 1.02:1 | 0.00 |

[1] The weight-percentage (wt-%) of each ingredient is based on the total weight of the composition.
[2] Ultrafiltered (UF) 5 × skim milk blend was prepared by blending together about 85 wt-% UF5 × skim milk retentate with about 15 wt-% condensed skim milk.
[3] Sugar-egg yolk blend was prepared by blending together about 10 wt-% sucrose with about 90 wt-% egg yolk. Egg yolk substitutes, especially cholesterol-free substances, may be used to replace the egg yolk component.
[4] Staley 200 liquid 26DE corn syrup (about 22.5 wt-% water).
[5] Staley 300 liquid 36DE corn syrup (about 20 wt-% water).
[6] Staley SWEETOSE 4300 liquid 63DE corn syrup (about 18.4 wt-% water).
[7] The yogurt premix was prepared according to Example II.

EXAMPLE IV

Composition of Ingredients

Compositions of ingredients listed in Table 1 are summarized in Table 2, shown below.

TABLE 2

| INGREDIENT PERCENTAGES[1] | | | | |
|---|---|---|---|---|
| | Solids | Total Protein | Lactose | Fat |
| UF5 × skim milk retentate | 22.50 | 16.50 | 4.00 | 0.30 |
| UF5 × skim milk blend[2] | 23.93 | 15.82 | 5.95 | 0.29 |
| Condensed skim milk | 32.00 | 11.50 | 17.00 | 0.21 |
| Cream (40 wt-% fat) | 45.70 | 2.00 | 2.80 | 40.00 |
| Sugar-egg yolk blend[3] | 48.70 | 14.40 | 0.00 | 24.00 |
| Corn syrup, 26DE[4] | 77.50 | 0.00 | 0.00 | 0.00 |
| Corn syrup, 36DE[5] | 80.00 | 0.00 | 0.00 | 0.00 |

TABLE 2-continued

| | INGREDIENT PERCENTAGES[1] | | | |
|---|---|---|---|---|
| | Solids | Total Protein | Lactose | Fat |
| Corn syrup. 63DE[6] | 81.60 | 0.00 | 0.00 | 0.00 |
| Sucrose | 100.00 | 0.00 | 0.00 | 0.00 |
| Liquid sucrose | 66.50 | 0.00 | 0.00 | 0.00 |
| Water | 0.00 | 0.00 | 0.00 | 0.00 |
| Vanilla | 0.00 | 0.00 | 0.00 | 0.00 |
| Yogurt premix[7] | 22.00 | 7.20 | 7.20 | 2.00 |

[1] The weight-percentage (wt-%) of each ingredient is based on the total weight of the composition.
[2] UF5 - skim milk blend was prepared by combining about 85% UF5 - skim milk retentate with about 15% condensed skim milk.
[3] Sugar-egg yolk blend was prepared by blending together about 10 wt-% sucrose with about 90 wt-% egg yolk.
[4] Staley 200 liquid 26DE corn syrup. about 22.5 wt-% water.
[5] Staley 300 liquid 36DE corn syrup. about 20 wt-% water.
[6] Staley SWEETOSE 4300 liquid 63DE corn syrup. about 18.4 wt-% water.
[7] The yogurt premix was prepared according to Example II.

EXAMPLE V

Stability Evaluation

The dessert products, produced from the compositions of Table 1, were stored for about 3-5 weeks at about 10° F. to duplicate typical distribution conditions as an accelerated stress test. The products were evaluated by a trained organoleptic panel according to "Sensory Evaluation Practices," H. Stone and J.L. Sidel, Academic Press, 1985. The panel evaluated the products according to sensory attributes of creaminess and iciness. Products having a high creaminess rating had a mouthfeel which was substantially smooth in texture without grittiness and a high butterfat mouthcoat. Products having a low iciness rating had a mouthfeel which substantially smooth in texture without grittiness, and with ice crystals being few in number and small in size.

Frozen dessert products having the elements of the invention were substantially creamier and had substantially reduced iciness than conventional products which do not utilize the elements of the present invention.

EXAMPLE VI

Quiescently Frozen Ice Cream and Yogurt Desserts

The seven compositions presented in Table 1 were prepared by appropriately mixing the listed ingredients except for yogurt premix and vanilla. The mixtures were then cooled to about 40° F. and held for 4-16 hours at that temperature to age the mixtures. For the dessert mixtures the vanilla ingredient was then added to each of compositions 1-5 and 7. For preparation of the yogurt dessert, the yogurt premix ingredient, as prepared according to the protocol described in Example II was added to composition 6.

Each mixture was partially frozen to about 30° F. in a typical ice cream freezer. Without incorporating pressurized air, each partially frozen mixture was extruded into a mold which was submerged in −45° to −5° F. of brine solution. A wooden or plastic stick was inserted at this point. Each product remained in the mold for 140-180 seconds after which time the mold was dipped into a brine solution of 60-65° F. to defrost the product and to facilitate extraction from the mold. The product was then stored in a freezer until evaluation.

Pursuant to this protocol, additional frozen desserts of the invention may be prepared by substitutive amounts of the appropriate ingredients in the foregoing steps.

What is claimed is:

1. A sweetened, aqueous composition suitable for preparing a quiescently frozen dairy dessert, comprising: partially hydrolyzed starch in an amount greater than about 6 wt-%, a sweetening agent, milk protein in an amount to provide a ratio of partially hydrolyzed starch to milk protein of at least 0.8:1, and water in amount of about 10 to 70 wt-%, the composition being free of added stabilizing gums, and the wt-% being based upon the total weight of the composition.

2. A composition according to claim 1, wherein the composition is capable of substantially retaining creaminess with substantially reduced iciness under conditions of partial thawing and refreezing when the composition is aerated and frozen.

3. A composition according to claim 1, further comprising a sweetening agent in an amount of about 0.001-18 wt-%, or fat in an amount of about 0.01-18 wt%, or a combination thereof, the weight percentages being based on the total weight of the composition.

4. A composition according to claim 1, further comprising sweetening agent in an amount of about 0.001-18 wt-%, water in an amount effective to achieve a total solids content of about 30-44 wt-%, wherein the milk protein is present in an amount of at least about 4 wt-%, and the partially hydrolyzed starch is present in an amount of about 6-16 wt-%, the weight percentages being based on the total weight of the composition.

5. A composition according to claim 4, further comprising a yogurt premix having a titratable acidity of 1.1-2.0, the weight percentage being based on the total weight of the yogurt premix, the yogurt premix being present in an amount of about 5-80 wt-%, the weight percentage of the yogurt premix being based on the total weight of the composition.

6. A premix composition suitable for preparing a quiescently frozen dairy dessert product, comprising: partially hydrolyzed starch in an amount greater than about 6 wt-%, the weight percentage being based on the total weight of the composition, and milk protein in an amount to provide a ratio of partially hydrolyzed starch to milk protein of at least about 0.8:1, the composition being free of added stabilizing gums.

7. A composition according to claim 6, wherein the composition is capable of substantially retaining creaminess with substantially reduced iciness under conditions of partial thawing and refreezing when the composition is combined with water, aerated and frozen.

8. A quiescently frozen, overrun or no overrun containing dairy dessert product comprising: a frozen, sweetened, aqueous composition of partially hydrolyzed starch in an amount greater than about 6 wt-%, the weight percentage being based on the total weight of the composition, and milk protein in an amount to provide a ratio of partially hydrolyzed starch to milk protein of at least about 0.8:1, and being free of added stabilizing gums.

9. A dessert product according to claim 8, wherein the frozen aqueous composition is capable of substantially retaining creaminess without iciness under conditions of partial thawing and refreezing.

10. A dessert product according to claim 8, wherein the partially hydrolyzed starch is a corn syrup having a dextrose equivalent of less than about 36.

11. A dessert product according to claim 8 wherein the composition is not aerated.

12. A dessert product according to claim 8 wherein the composition is quiescently or not quiescently frozen.

13. A dessert product according to claim 12 wherein the composition is quiescent and has an overrun of from about 10% to 120%.

14. A dessert product according to claim 13 wherein the overrun is less than 15%.

15. A dessert product according to claim 8, further comprising a sweetening agent in an amount of about 0.001-18 wt-%, or fat in an amount of about 0.01-18 wt-%, or a combination thereof, the weight percentages being based on the total weight of the dessert product.

16. A dessert product according to claim 8, further comprising a cultured premix in an amount of about 5-80 wt-% the weight percentage being based on the total weight of the dessert product.

17. A method of preparing a dairy dessert product, comprising:
  (a) blending together a mixture of partially hydrolyzed starch in an amount greater than about 6 wt-%, the weight percentage being based on the total weight of the dessert product, and milk protein in an amount to provide a ratio of partially hydrolyzed starch to milk protein of at least about 0.8:1;
  (b) pasteurizing the mixture;
  (c) homogenizing the mixture;
  (d) cooling the mixture to about 40° F.;
  (e) aging the mixture for about 0-24 hours; and
  (f) freezing the mixture under quiescent conditions to produce the dessert product;
said dessert product being capable of retaining creaminess with substantially reduced iciness under conditions of partial thawing and refreezing.

18. A method according to claim 17, wherein the freezing step is conducted in two stages, the first including agitation to provide an overrun of about 15 to 120% and the second being conversion of the product to a hard consistency.

19. A method according to claim 17, wherein the mixture is quiescently frozen with or without an overrun.

20. A method of preparing a yogurt premix, comprising:
  (a) mixing together an amount of skim milk, cream and water effective to form a mixture;
  (b) pasteurizing the mixture;
  (c) homogenizing the mixture;
  (d) fermenting the mixture with a bacterial culture without agitation at a temperature effective to optimize growth of the lower lactic acid-producing bacterial strain, and until the titratable acidity of the mixture reaches about 1.1-2.0, thereby producing the yogurt premix; and said premix, when added to an amount of pasteurized, homogenized and cooled dairy dessert composition comprising partially hydrolyzed starch in an amount greater than about 6 wt-%, the weight percentage being based on the total weight of the dessert product, and milk protein in an amount to provide a ratio of partially hydrolyzed starch to milk protein of at least about 0.8:1, being capable of providing quiescently frozen yogurt dessert product having creaminess with substantially reduced iciness under conditions of partial thawing and refreezing.

* * * * *